(12) United States Patent
Solfrank et al.

(10) Patent No.: US 8,210,018 B2
(45) Date of Patent: Jul. 3, 2012

(54) METHOD OF MAKING A COMPENSATION SHAFT

(75) Inventors: Peter Solfrank, Frensdorf (DE); Stefan Hess, Herzogenaurach (DE); Patrick Ullmann, Herzogenaurach (DE); Alexander Kern, Erlangen (DE)

(73) Assignee: Schaeffler Technologies AG & Co. KG, Herzogenaurach (DE)

( * ) Notice: Subject to any disclaimer, the term of this patent is extended or adjusted under 35 U.S.C. 154(b) by 132 days.

(21) Appl. No.: 12/849,843

(22) Filed: Aug. 4, 2010

(65) Prior Publication Data

US 2011/0030444 A1      Feb. 10, 2011

(30) Foreign Application Priority Data

Aug. 4, 2009  (DE) .......................... 10 2009 036 067

(51) Int. Cl.
*B21D 22/00*      (2006.01)

(52) U.S. Cl. ......................................................... 72/352
(58) Field of Classification Search .................... 72/352, 72/356, 357
See application file for complete search history.

(56) References Cited

FOREIGN PATENT DOCUMENTS

DE      102007019008      10/2008

*Primary Examiner* — Faye Francis
(74) *Attorney, Agent, or Firm* — Volpe and Koenig, P.C.

(57) ABSTRACT

A method of making a compensation shaft (1) out of a drop-forged shaft blank (11) is provided. The compensation shaft includes a shaft section (5) with a base body (16) and a rib (15) with a height H starting from the base body. The method includes separating the forging ridges (14) formed in the die (9, 10) by trimming the forged shaft blank into a shape close to the final contour of the base body at trimming points, with the distance S2 between these trimming points being substantially smaller than the distance S1 between the forging ridges prior to separation.

5 Claims, 1 Drawing Sheet

METHOD OF MAKING A COMPENSATION SHAFT

CROSS-REFERENCE TO RELATED APPLICATIONS

This application claims the benefit of German Patent Application No. 102009036067.0, filed Aug. 4, 2009, which is incorporated herein by reference as if fully set forth.

BACKGROUND

The invention concerns a method of making a compensation shaft out of a drop-forged shaft blank. The compensation shaft comprises a shaft section with a mass center of gravity which extends eccentric to the axis of rotation of the compensation shaft and which, together with the axis of rotation of the compensation shaft, creates an unbalanced mass plane which extends substantially perpendicularly to the die parting plane. The shaft section comprises a base body and a rib with a height H starting from the base body and extending, with regard to the axis of rotation, in a direction of the unbalanced mass plane oriented away from the mass center of gravity.

A compensation shaft of the above-noted type is used in internal combustion engines for providing a partial or complete compensation of the free mass forces and/or mass torques. The radial mounting of the compensation shaft is increasingly accomplished through low-friction needle roller bearings that are in direct rolling contact with the bearing journal of the compensation shaft, so that needle roller-mounted compensation shafts are generally configured as forgings with a high tribological load bearing capacity. This is also the case in DE 10 2007 019 008 A1 in which, with a view to a homogenous fiber orientation in the region of the highly loaded tribological load zone of the bearing journal, it is proposed to orient the parting plane of the die in a direction perpendicular to the unbalanced mass plane of the compensation shaft.

The shaft sections extending between and next to the bearing journals and decisively participating in the unbalanced mass action of the compensation shaft comprise stiffening ribs in direction of the unbalanced mass plane, which ribs are formed through the hollow mold of one of the die halves because the die parting plane extends perpendicularly to the unbalanced mass plane. This flow of material, known in forging techniques as swelling, occurs in opposition to the lift movement of the die halves and, with a view to completely filling the hollow rib mold, it is required that a sufficient volume of material be available also in direction of the die parting plane, which material volume is pressed under very high pressure on the one hand in direction of the hollow rib mold and on the other hand in direction of the ridge gaps of the die with formation of the forging ridges. Consequently, the forgeable height of the rib, i.e. its extent in direction of the unbalanced mass is limited by the width of the forged shaft blank, which width extends in direction of the die parting plane.

SUMMARY

The object of the present invention is to improve the manufacturing method of a compensation shaft forged in a drop forging die, so that the height of the rib relative to the width of the base body from which the rib rises can be maximized.

This objective is achieved through the method according to the invention. Advantageous developments and embodiments of the invention will become apparent from the following description and claims. The invention provides the following method step: separation of the forging ridges formed in the die by trimming the forged shaft blank into a shape close to the final contour of the base body at trimming points on both sides of the unbalanced mass plane, a distance S2 between the trimming points being substantially smaller than a distance S1 between the forging ridges prior to separation.

In other words, deburring of the forged shaft blank is not restricted as heretofore to the separation of the thin-walled forging ridges but is effected in the thick-walled region of the base body, so that cut edges with comparatively large cut surfaces are formed that extend substantially parallel to the unbalanced mass plane. The degree of freedom created in this way makes it possible to increase, if necessary, the width of the hollow forging molds extending in direction of the die parting plane in correspondence with the required filling height of the hollow rib mold because the material not required in the width is separated thick-walled and preferably without chip removal after forging. The thickness D of the cut edges, i.e. the material thickness which has to be cut through is preferably at least half as large as the distance S2 between the trimming points: $D:S2 > 0.5$.

According to a preferred development of the invention, the following ratios are true for the distance S1 between the forging ridges, the distance S2 between the trimming points and the height H of the rib: $S2:S1 < 0.5$ and $S1:H > 2$, preferably $> 3$. In other words, after trimming, the base body should be, at the most, half as wide as the forged shaft blank if this has only been deburred, and the hollow forging molds minus the ridge lands should have at least double, preferably triple the width of the hollow rib mold.

With a view to achieving a trimming method using as low a force as possible, the invention further provides for the trimming to be done in the still warm state of the shaft blank, i.e. within a short time after forging.

BRIEF DESCRIPTION OF THE DRAWINGS

Further features of the invention will become apparent from the following description and the appended drawings which illustrate one exemplary embodiment of the invention. The figures show in partially simplified or schematic illustrations.

DETAILED DESCRIPTION OF THE PREFERRED EMBODIMENTS

Figure 4:
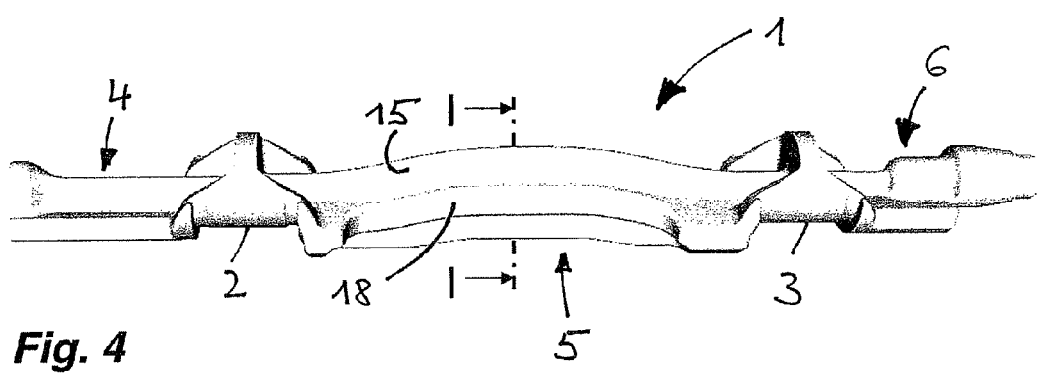
FIG. 4 a perspective view of a compensation shaft made according to the method of the invention.

FIG. 4 shows a compensation shaft 1 made according to the method of the invention, in finished state. The compensation shaft 1 forms a part of a mass balancing mechanism which serves for compensation of the free mass forces of the second order of an internal combustion engine of a four-cylinder in-line type. In this case, the mass balancing mechanism comprises two such compensation shafts 1 which rotate in opposite directions at double the crankshaft speed. For the sake of a simplified illustration, the attached parts required for driving the compensation shaft 1, such as, for example, a chain sprocket or a pinion have been omitted.

The forged compensation shaft 1 comprises two bearing journals 2 and 3 of circular cross-section. The bearing journals 2, 3 are finished by machining and induction-hardened and serve as inner raceways for the needle rollers of respective needle roller bearings through which the compensation shaft 1 is radially roller bearing-mounted in the internal combustion engine. Shaft sections 4 to 6 extending on both sides of the bearing journals 2, 3 are configured, with a view to their function, as unbalanced mass sections so that the compensation shaft 1 has a mass center of gravity 8 which is eccentric to its axis of rotation 7 and produces the unbalanced mass. The mass center of gravity 8 together with the axis of rotation 7 creates an unbalanced mass plane (see FIG. 3). A part of the unbalanced mass action is also produced by the geometry of the two bearing journals 2, 3 because, in peripheral direction, these journals have a variable width matched to the so-called lumped loading of the inner raceway. This configuration of the bearing journals 2, 3 is known, per se, from EP 1 775 484 A2 and is explained here only in so far as, during rotation of the compensation shaft 1, the bearing journals 2, 3 are loaded by the simultaneously rotating unbalanced mass, so that a quasi stationary load zone, that is to say a load zone which is immobile relative to the rotating inner raceway, is formed on each inner raceway. This load zone extends within the wider fractional periphery of the bearing journals 2, 3 on the side of the mass center of gravity 8 and is substantially symmetric to the unbalanced mass plane. The low load outside of the load zone permits a clear tapering of the inner raceways outside of the load zone.

Figure 1:
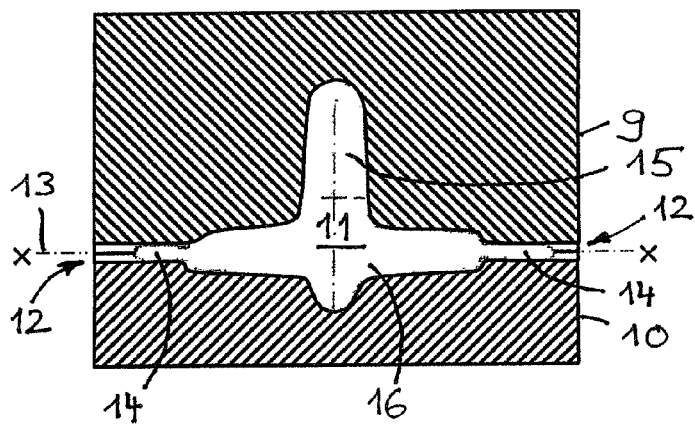
FIG. 1 a cross-sectional view of a drop forging mold with a finished forged shaft blank.
Figure 2:
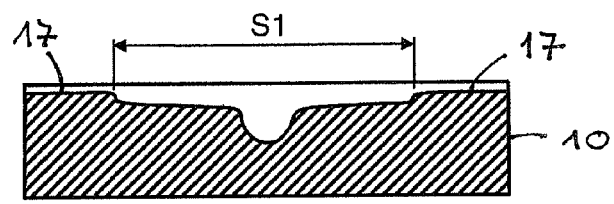
FIG. 2 a view of the lower drop forging mold of FIG. 1.

FIG. 1 shows the cross-section corresponding to the section I-I of FIG. 4 through a forging die 9, 10 with a schematic representation of the finished, forged shaft blank 11 situated therein; FIG. 2 shows the lower die 10. The die is a so-called ridge die in which a part of the shaped material of the shaft blank 11 is displaced—through narrow cross-section ridge gaps 12 situated in the region of the die parting plane 13 which is shown as a dot-dash line—out of the hollow molds of the upper and lower dies 9 and 10 outwards with formation of the forging ridges 14 to be separated subsequently. This promotes the complete filling of the die 9, 10 and, in particular, the hollow rib mold of the upper die 9 in which a rib 15 for stiffening the rapidly rotating compensation shaft 1 is formed. The rib 15 starts from a the base body 16 of the shaft section 5 and has a height H (see FIG. 3) while extending, with regard to the axis of rotation 7 of the compensation shaft 1, in a direction of the unbalanced mass plane oriented away from the mass center of gravity 8. The die parting plane 13 extends perpendicular to and within the base body 16.

As already mentioned above, the so-called swelling of the material into the hollow rib mold requires a material distribution in the die 9, 10 such that an adequate volume of pressurized material extends in direction of the die parting plane 13. This is achieved in the present case by the fact that the forged width of the shaft blank 11, i.e. the distance S1 between the forging ridges 14 is at least three-times the height H of the rib 15 (the forging ridges 14 formed between the ridge lands 17 are not included in the dimension S1).

Figure 3:
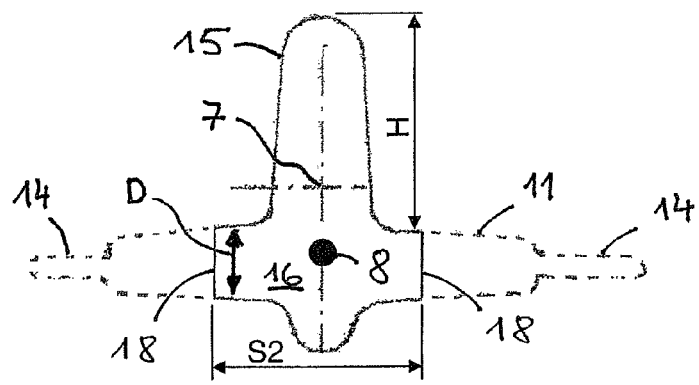
FIG. 3 a cross-sectional view of the forged shaft blank after trimming.

As can be seen in FIGS. 3 and 4, this initially forged width S1 is no longer existent on the shaft section 5 of the finished compensation shaft 1. Rather, the separation of the forging ridges 14 (with a separating tool, not shown) is performed at trimming points on both sides of the unbalanced mass plane, a distance S2 between the trimming points being clearly smaller than the distance S1 between the forging ridges 14 prior to separation (see dotted line in FIG. 3). Because, in the present case, the ratio S2:S1 is 0.5, trimming of the forged shaft blank 11 is performed in the thick-walled region of the base body 16 and produces the wide cut surfaces 18 that are clearly shown in FIG. 4. The thickness D of the cut surfaces (measured in direction of the unbalanced mass plane) in the finished compensation shaft 1 is approximately 8 mm with S2 being 14 mm, so that a ratio D:S2=0.57 is obtained.

The step of the simultaneous non-chipping trimming of the shaft blank 11 at both trimming points follows the forging step very closely in time, so that, due to the still heated shaft blank 11, the cutting forces of the tool can be minimized. A finishing of the cut surfaces 18 by machining is not provided by the invention.

LIST OF REFERENCE NUMERALS

1 Compensation shaft
2 Bearing journal
3 Bearing journal
4 Shaft section
5 Shaft section
6 Shaft section
7 Axis of rotation
8 Mass center of gravity
9 Upper die
10 Lower die
11 Shaft blank
12 Ridge gap
13 Die parting plane
14 Forging ridge
15 Rib
16 Base body
17 Ridge land
18 Cut surface
S1 Inner distance between the forging ridges
S2 Distance between the trimming points
H Height of the rib
D Thickness of the cut surface

The invention claimed is:

1. A method of making a compensation shaft out of a drop-forged shaft blank, said compensation shaft comprising a shaft section having a mass center of gravity which extends eccentric to an axis of rotation of the compensation shaft and which, together with the axis of rotation, creates an unbalanced mass plane which extends substantially perpendicular to a die parting plane, said shaft section comprising a base body and a rib with a height H starting from the base body while extending, with regard to the axis of rotation, in a direction of the unbalanced mass plane oriented away from the mass center of gravity, the method comprising:

separating forging ridges formed in the die by trimming the forged shaft blank into a shape close to a final contour of the base body at trimming points on both sides of the unbalanced mass plane, with a distance S2 between trimming points being substantially smaller than a distance S1 between the forging ridges prior to separation.

2. The method according to claim 1, wherein the distance S1 between the forging ridges, the distance S2 between the trimming points and the height H of the rib have the following ratios: S2:S1<0.5 and S1:H>2.

3. The method according to claim 2, wherein S1:H>3.

4. The method according to claim 1, wherein the base body has a thickness D measured in a direction of the unbalanced mass plane at the trimming points which has a ratio: D:S2>0.5.

5. The method according to claim 1, further comprising performing the trimming at a short time after forging, in a warm state of the shaft blank.

* * * * *